Dec. 2, 1958  H. E. CANN, SR  2,862,782
LIQUID LEVEL INDICATOR
Filed May 11, 1954  2 Sheets-Sheet 1
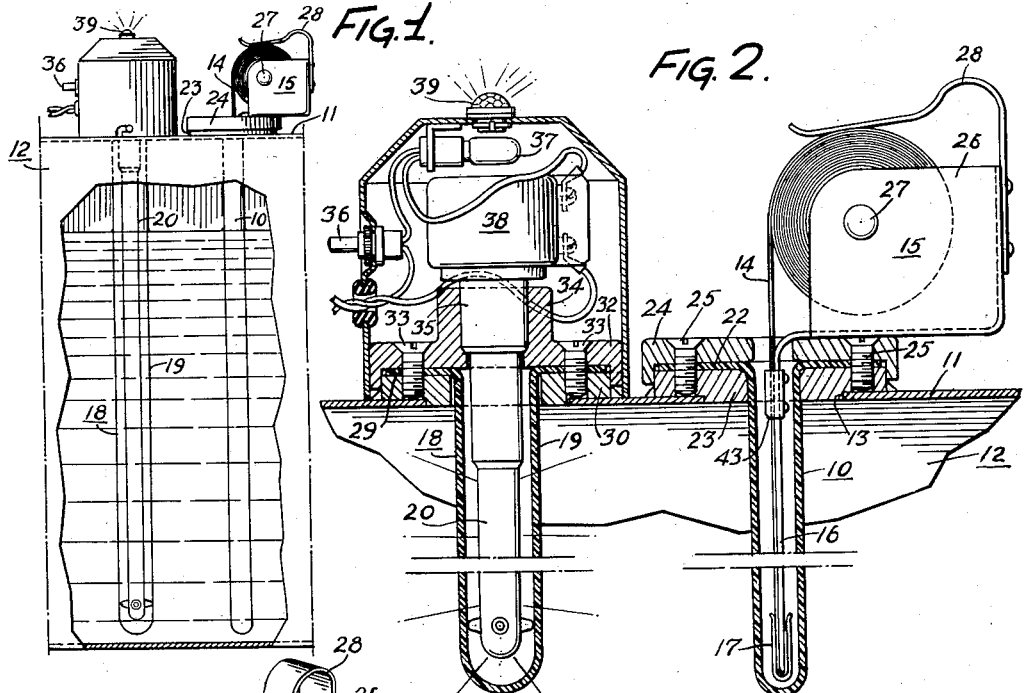
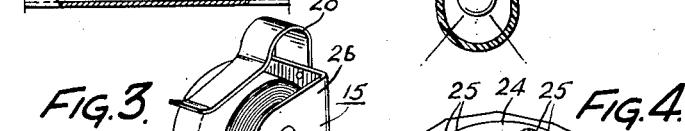
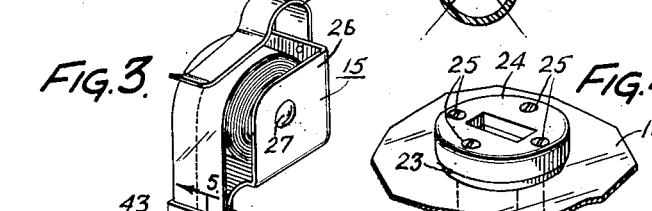
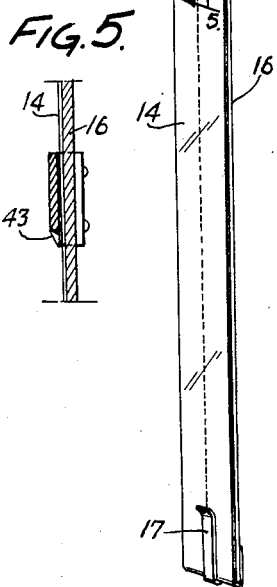
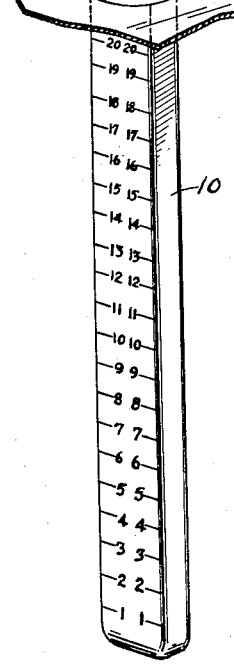
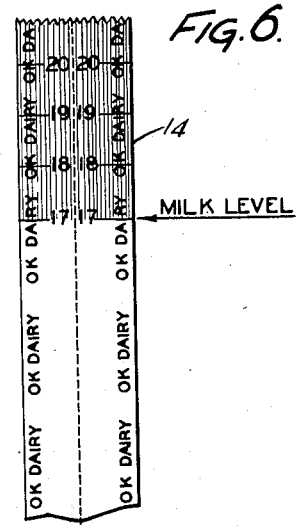
Inventor:
Harry E. Cann Sr.
by his Attorneys
Howson & Howson Dec. 2, 1958    H. E. CANN, SR    2,862,782
LIQUID LEVEL INDICATOR
Filed May 11, 1954    2 Sheets-Sheet 2
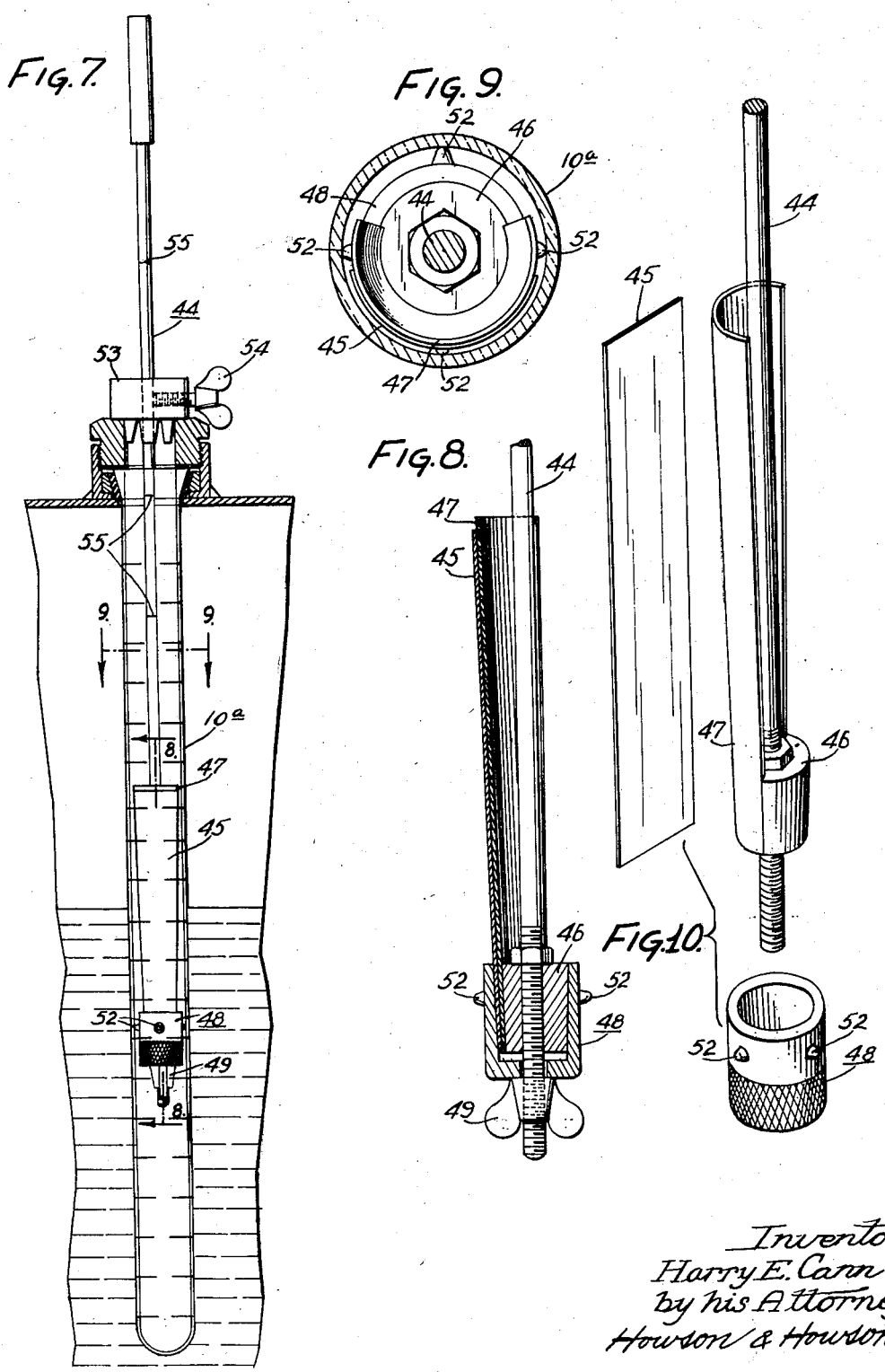
Inventor:
Harry E. Cann Sr.
by his Attorneys
Howson & Howson

United States Patent Office 2,862,782
Patented Dec. 2, 1958

2,862,782

LIQUID LEVEL INDICATOR

Harry E. Cann, Sr., West Chester, Pa., assignor to Esco Cabinet Company, West Chester, Pa., a corporation of Pennsylvania Application May 11, 1954, Serial No. 429,065

4 Claims. (Cl. 346—107)

This invention relates to liquid level indicators and more particularly to a device for indicating the level of liquid in a bulk tank.

The invention contemplates, as an indicating and recording means, the use of a light-sensitive element in the form preferably of a strip which is inserted into a transparent graduated tube depending into a liquid containing vessel so as to be partially immersed in the liquid. Exposure of the element to light leaves the graduation indicia in relief and thus a permanent record of the liquid level is made.

A principal object of the invention is to provide a liquid level indicator particularly adapted to measure the level of milk in a bulk tank without contaminating the milk.

A further object of the invention is to provide a liquid level indicator wherein photographic means are employed to record a liquid level on sensitized material.

A further object of the invention is to provide a device of the stated type wherein light-sensitive means is disposed in a liquid-containing vessel so that a portion thereof is immersed and a portion protrudes above the level of the liquid so that a light source disposed above the surface upon energization exposes the protruding portion to indicate on the light-sensitive means the level of the liquid.

A further object of the invention is to provide a device of the character described wherein the light-sensitive means takes the form of a continuous tape, the spent portions of which may be readily severed.

Another object of the invention is to provide a liquid level indicator of the type mentioned wherein the light-sensitive means takes the form of a strip of limited length which may be inserted in the tube to a depth approximating the level of liquid in the vessel.

A still further object of the invention is to provide a liquid level indicator for bulk milk tanks in which two identical permanent records of the milk level at times are simultaneously made.

The invention resides further in certain structural details hereinafter described and illustrated in the attached drawings wherein:

Fig. 1 is an elevational view, partly broken away, of a portion of a liquid containing vessel having the indicating means of the present invention mounted therein;

Fig. 2 is an enlarged detailed view of the liquid level indicator means of Fig. 1;

Fig. 3 is a view in perspective of the light-sensitive element and the mounting therefor;

Fig. 4 is a view in perspective of the transparent tube in which the light-sensitive element is received;

Fig. 5 is a view taken substantially on line 5—5 of Fig. 3; and

Fig. 6 is an enlarged fragmentary detailed view of the light-sensitive element after exposure;

Fig. 7 is an elevational view partly in section of a modified form of the invention;

Fig. 8 is an enlarged elevational view partly in section showing the means by which the strip of a modified form of the invention is secured in position;

Fig. 9 is a further enlarged plan view of the device of Fig. 8; and

Fig. 10 is an exploded view of the constituent elements of the device of Fig. 8.

With reference to the drawings and more particularly to Figs. 1 and 2, the embodiment of the invention therein illustrated comprises essentially a transparent tube 10 mounted on and depending through an aperture 13 in the top wall 11 of a tank or vessel 12. A light-sensitive element 14, which preferably takes the form of a tape, is arranged in a roll in the support member 15. This support member is provided with an integral depending tongue 16 to which a portion of the tape is secured by means of clips 17. A suitable light source 18 has a depending transparent tube 19 in which is arranged a suitable light-producing element 20 which preferably takes the form of an ultra-violet lamp when the device is employed to measure the level of bulk milk since the propagation of bacteria is thereby inhibited. The tape employed is of the type which is sensitive only to light of relatively high intensity in close proximity and thus is not initially exposed while being inserted in the tube. When an indication of the liquid level is desired, the light source is energized to expose the portion of the light-sensitive element above the level of the liquid.

In the device of Figs. 1 and 2 the transparent tube 10 is substantially rectangular in cross-section and is provided with a flange 22 which seats on a plate 23 and secured thereto by means of a cap 24 and fastening elements 25. Suitable graduations are arranged on the exterior surfaces of the tube so that the number of units of liquid present in the tank will be indicated on the tape 14. It will be apparent that these graduations may indicate inches of liquid for a particular sized tank or be calibrated to read directly in gallons. As clearly shown in Figs. 2 and 3, the support member 15 is provided with side walls 26 in which is journaled the shaft 27 for the tape roll. The spring clip 28 prevents accidental unrolling of the tape.

The tube 19, in which the light source 18 is mounted, is mounted by means of the integral flange 29, on plate 30, secured to the top wall of the vessel. This flange is retained in position by means of a cap 32 and fastening elements 33. An integral upstanding flange 34 on the cap 32 receives the body portion 35 of the lamp base. A suitable electric circuit is provided including a contact switch 36, an indicator bulb 37 and a transformer 38. These elements are arranged in series so that when the operator presses the button of the switch 36 the bulb 37 is energized, thus energizing the reflector 39, and the transformer is actuated, thus stepping down the voltage to the desired degree.

In the modified form of the invention disclosed in Fig. 7, there is provided a tube 10a, generally circular in cross-section for the reception of a rod 44 which supports the strip 45 of light-sensitive material in any one of several selected vertical positions within the tube. An inwardly and downwardly tapered plug 46 is positioned at the lower extremity of the rod 44 and to this plug is secured a support strip 47 which is bowed to conform to the shape of the plug 46. For securing the strip 45 to the surface of the support strip 47, there is provided a cap 48, the inside surfaces of which are tapered to correspond to the configuration of the plug 46. A wing nut 49 is provided to retain the cap 48 in position. Proper alignment of the cap within the tube is assured by protuberances 52 which are disposed in spaced relation about the circumference of the cap. To assure that the strip 45 is inserted into the tube to a depth approximating the anticipated content of the vessel, a collar 53 is adjustably secured on the rod 44 by means of a thumb screw 54. Notches 55 on the rod determine the position of the collar 53. For instance, the collar will be positioned at the uppermost notch to record the level of the milk after the product of the first milking has been deposited in the vessel and the collar will be positioned at the lowermost notch for a reading close to the top of the vessel after the last milking has been deposited. The device of Fig. 7 is intended to be used in conjunction with a light source of the type disclosed in Figs. 1 and 2.

In operation of the principal form of the invention the dairyman releases from the roll sufficient tape to cover the tongue 16. The end of this type is wrapped around the bottom edge of the tongue and is secured in place by the clip 17. The tongue along with the tape is then inserted in the tube 10 so that the respective elements assume the position shown in Fig. 2. The operator then presses the button of the switch 36 so that the lamp 20 is energized and the resulting light exposes the portion of the tape above the level of the liquid. The portions of the tape behind the numerals remain unexposed and thus the number of units of liquid contained in the vessel is recorded. As clearly shown in Fig. 6 the tape is perforated along its longitudinal axis so that it may be divided into two portions, each of which contains a permanent record of the amount of liquid in the tank at the time of measuring. Once the recording has been made the entire tape retainer assembly is removed from the tube 10 and the length of tape corresponding to the length of the tube is severed by tearing along the tear edge 43 as clearly shown in Figs. 3 and 5. To operate the indicating device of Fig. 7, the dairyman merely loosens the wing nut 49 and then slides the cap 48 axially of the rod 44 away from the plug 46. The strip 45 is then wrapped around the support strip 47 and the cap is then moved to the position shown in Fig. 8 and secured in that position by the wing nut 49. The rod is then lowered to a predetermined position and the light source is energized as in the principal form of the invention.

It will be apparent that a sanitary measuring device is provided which is particularly suitable for measuring the level of milk in bulk. The tape itself does not come in contact with the milk and thus contamination by this means is prevented. The portions of the device which contact the milk are capable of being readily sterilized to meet the most rigid sanitary requirements. The above described device is capable of measuring the level of liquids with a high degree of accuracy and further, provides a permanent record in duplicate, one copy for the dairyman, and one copy for the dairy to which the milk is sold.

I claim:

1. In an indicating device for use in a container to provide an enduring record of the level of liquid in said container, the combination comprising a transparent tube having an open upper end extending above the liquid-containing space of said container, a support associated with said tube at its upper end, a mounting member for a light sensitive element provided to furnish a record of the portion of said element exposed to light, a support for said mounting member adapted to rest upon said first-mentioned support with said element and mounting member depending across and below the liquid level within said container, and a source of light within said container positioned to illuminate the portion of said element above the liquid level in said container to produce the desired record on said light sensitive element and thereby provide a visible record on said light sensitive element of the portion thereof above the liquid level.

2. In an indicating device for use in a container to provide an enduring record of the level of liquid in said container, the combination comprising a transparent tube having an open upper end extending above the liquid-containing space of said container, a support associated with said tube at its upper end, a mounting member for a light sensitive element provided to furnish a record of the portions of said element exposed to light, said mounting member including a tongue adapted to be projected downwardly into said transparent tube a predetermined distance, and a support for a roll of said light sensitive element, a support for said mounting member adapted to rest upon said first-mentioned support with said element and mounting member depending across and below the liquid level within said container, and a source of light within said container positioned to illuminate the portion of said element above the liquid level in said container to produce the desired record on said light sensitive element and thereby provide a visible record on said light sensitive element of the portion thereof above the liquid level.

3. In an indicating device for use in a container to provide an enduring record of the level of liquid in said container, the combination comprising a transparent tube having an open upper end extending above the liquid-containing space of said container, a support associated with said tube at its upper end, a mounting member comprising a tongue adapted to be projected a predetermined distance downwardly through said transparent tube and a support above said tongue for a roll, a roll of flexible light sensitive material mounted upon said roll support and provided with duplicate, longitudinally extending, portions separated by a tear line, means to support successive end portions of said flexible material in predetermined relation to said tongue, and a source of light within said container positioned to illuminate the portion of said light sensitive material above the liquid level in said container to produce the desired record on said light sensitive material, whereby when said light sensitive material is supported in the desired predetermined relation to said tongue and the tongue is inserted in said tube and the source of light energized a duplicate record will be furnished on said light sensitive material of the liquid level of said container.

4. In an indicating device for use in a container to provide an enduring record of the level of liquid in said container, the combination comprising a transparent tube having longitudinally-spaced depth-indicating opaque indicia thereon and an open upper end extending above the liquid-containing space of said container, a support associated with said tube at its upper end, a mounting member for a light sensitive element provided to furnish a record of the portion of said element exposed to light, a support for said mounting member adapted to rest upon first-mentioned support with said element and mounting member depending across and below the liquid level within said container, and a source of light within said container positioned to illuminate the portion of said element above the liquid level in said container to produce the desired record on said light sensitive element and thereby provide a visible record on said light sensitive element of the portion thereof above the liquid level, in contrast against unchanged portions of said element recording the depth-indicating indicia from said tube.

References Cited in the file of this patent

UNITED STATES PATENTS

| 345,106 | Brayton | July 6, 1886 |
| 1,068,370 | Simpson et al. | July 22, 1913 |
| 1,434,862 | Wheeler | Nov. 7, 1922 |
| 2,598,551 | Jackson | May 27, 1952 |

FOREIGN PATENTS

| 815,258 | Germany | Oct. 1, 1951 |